(12) United States Patent
Koh (10) Patent No.: US 12,111,994 B2
(45) Date of Patent: Oct. 8, 2024

(54) INPUT SYSTEM

(71) Applicant: Clement Koh, Riverwood (AU)

(72) Inventor: Clement Koh, Riverwood (AU)

( * ) Notice: Subject to any disclaimer, the term of this patent is extended or adjusted under 35 U.S.C. 154(b) by 0 days.

(21) Appl. No.: 18/560,881

(22) PCT Filed: Apr. 5, 2023

(86) PCT No.: PCT/AU2023/050272
§ 371 (c)(1),
(2) Date: Nov. 14, 2023

(87) PCT Pub. No.: WO2023/201386
PCT Pub. Date: Oct. 26, 2023

(65) Prior Publication Data
US 2024/0295934 A1    Sep. 5, 2024

(30) Foreign Application Priority Data
Apr. 21, 2022 (AU) ................. 2022901055

(51) Int. Cl.
*G06F 3/041* (2006.01)
*G06F 3/01* (2006.01)
*G06F 3/0354* (2013.01)

(52) U.S. Cl.
CPC ............ *G06F 3/0416* (2013.01); *G06F 3/014* (2013.01); *G06F 3/0354* (2013.01); *G06F 2203/0331* (2013.01); *G06F 2203/04104* (2013.01)

(58) Field of Classification Search
CPC ...... G06F 3/0416; G06F 3/014; G06F 3/0354; G06F 2203/0331; G06F 2203/04104
See application file for complete search history.

(56) References Cited

U.S. PATENT DOCUMENTS

| | | | |
|---|---|---|---|
| 9,785,264 B2 * | 10/2017 | Santos | G06F 3/04186 |
| 2004/0012574 A1 | 1/2004 | Sharma | |
| 2014/0168142 A1 * | 6/2014 | Sasselli | G06F 3/044 |
| | | | 345/174 |
| 2014/0267078 A1 | 9/2014 | Kukulski et al. | |
| 2015/0346847 A1 | 12/2015 | Zachut et al. | |
| 2016/0188181 A1 * | 6/2016 | Smith | G06F 3/04886 |
| | | | 715/765 |
| 2016/0299387 A1 * | 10/2016 | Yamazaki | G02F 1/134336 |

(Continued)

OTHER PUBLICATIONS

International Preliminary Report on Patentability dated Nov. 2, 2023 from PCT Application No. PCT/AU2023/050272.

(Continued)

*Primary Examiner* — Andrew Sasinowski
(74) *Attorney, Agent, or Firm* — INNOVATION CAPITAL LAW GROUP, LLP; Vic Lin (57) ABSTRACT

An input system has a positional input configured for detecting positional input interactions with a surface thereof and a plurality of input devices configured for detecting touch interactions. The controller is configured to receive signals from the positional input and the input devices, match positional input interactions with touch interactions by temporally correlating timing of the interactions and match any remaining unmatched interactions by spatially correlating an assigned spatial ordering of the input devices with coordinates of the positional input interactions to generate input interaction signals for a computer device.

15 Claims, 8 Drawing Sheets

(56) References Cited

U.S. PATENT DOCUMENTS

2016/0364052 A1    12/2016  Castellani et al.
2020/0348817 A1    11/2020  Ohlsson et al.
2022/0026998 A1     1/2022  Zimmerman et al.

OTHER PUBLICATIONS

International Search Report & Written Opinion dated Jun. 23, 2023 from PCT Application No. PCT/AU2023/050272.

* cited by examiner

INPUT SYSTEM

FIELD OF THE INVENTION

This invention relates generally to a type of computer input system.

BACKGROUND OF THE INVENTION

Input systems are used to interact with electronic devices with a variety of input devices. These input devices may comprise mouse pointers, keyboards, touch sensitive pads, touch sensitive screen overlays and the like.

US 2022/0026998 A1 (APPLE INC.) 27 Jan. 2022 gives an example of user input system including a stylus and an electronic device wherein a user may manipulate the stylus across an input surface of the electronic device and the movement may be detected using axially-aligned electric fields generated by the stylus.

According to US 2022/0026998 A1, the stylus may be identified by a "ring signal" which is detected through the surface of the electronic device. In this way, more than one stylus may interact simultaneously with the electronic device.

The present invention seeks to provide an input system, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein an input system interfacing a device. The system comprises a positional input configured for detecting positional input interactions with a surface thereof. Each positional input interaction is assigned respective coordinates with respect to the surface.

The system further comprises a plurality of input devices configured for detecting touch interactions.

Each touch interaction is assigned a respective input device ID. Furthermore, the devices are assigned a spatial ordering. Furthermore, the spatial ordering is configured with respect to an axis of the surface.

The input devices may comprise finger wearable devices wherein each input device may comprise a slimline capacitive sensitive pad at each fingertip and which is wired to a central wrist worn controller. The wrist worn controller may receive capacitance signals from each pad to detect the touch interactions and to assign touch IDs to each touch interaction.

The system further comprises a controller configured to receive signals from the positional input and the input devices.

The controller is configured for matching positional input interactions with respective touch interactions by temporally correlating timing of the interactions.

However, for simultaneous touches wherein, for example, the user presses the fingers simultaneously against the surface of the positional input so that more than one touch interaction appears within a sampling window of a positional input, the controller may be further configured for matching any remaining unmatched interactions by spatially correlating the assigned spatial ordering of the input devices and the coordinates of the positional input interactions.

Having matched the positional input interactions and the attached interactions, the controller is able to generate input interaction signals for the device, each input interaction comprising respective coordinates and an ID of a respective input device.

In embodiments, the controller may be configured according to an application-specific context requiring a specific hand positioning and input device configurations. A controller interface may be installed on an operating system of the device which allows an application to configure the controller with an application specific context of the application.

The application-specific context may be used to determine the spatial ordering and the orientation of the spatial axis. As such, the controller is able to generate the input interaction signals by processing the interactions according to the provided application-specific context.

In embodiments, the controller may process the interactions according to defined regions which may be specific to areas of a surface of a positional input. Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
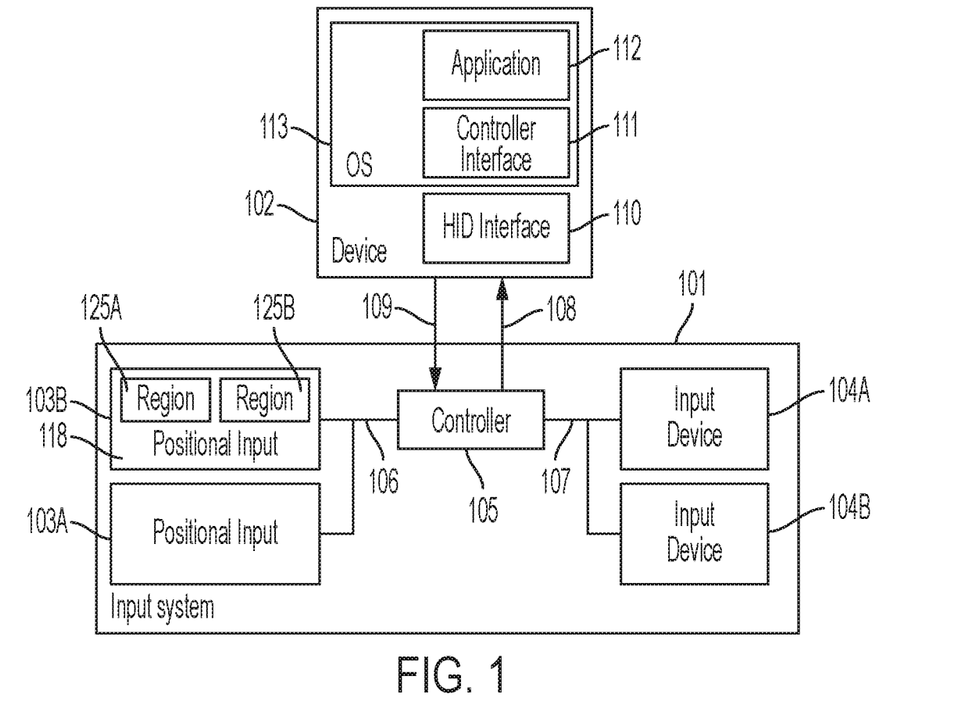
FIG. 1 shows a schematic of an input system interfacing the device in accordance with an embodiment.
Figure 2:
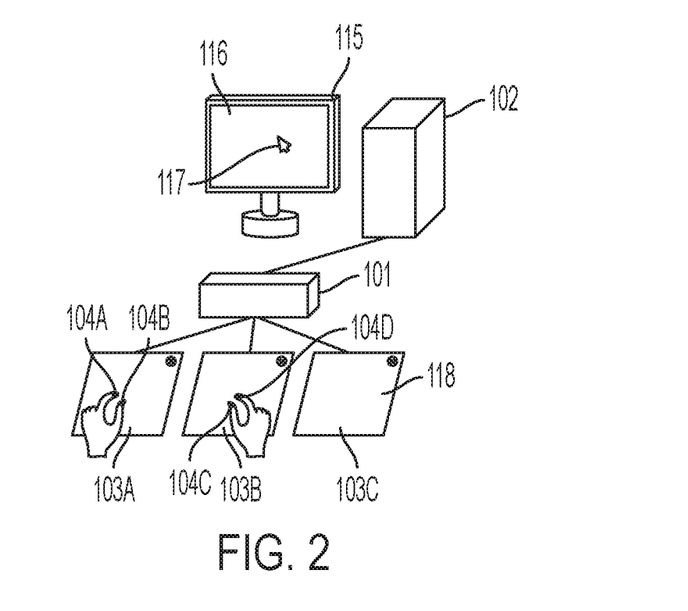
FIG. 2 shows a physical example of the input system interfacing the device.

FIG. 1 shows a functional block level diagram schematic of an input system 101 interfacing a computer device 102. With reference to FIG. 2, the device 102 may comprise a digital display 115 configured to display a user interface 116 of an application 112. The user interface 116 may comprise an input pointer 117.

The system 101 comprises a positional input 103. The positional input 103 is configured for detecting positional input interactions with a surface thereof. Each positional input interaction is assigned respective XY coordinates with respect to the surface.

According to the embodiment shown in FIG. 2, the positional input 103 comprises a touchpad. However, in alternative embodiments, the positional input 103 may comprise a touch sensitive layer overlaid the display 115 of the device 102.

The system 101 may comprise a plurality of positional inputs 103. For example, in the embodiment shown in FIG. 2, the system 101 comprises three positional inputs 103.

The positional inputs 103 may detect positional input interactions therewith capacitively. For example, is an object touches the surface 118 of the positional input 103, a matrix of capacitive sensors thereunderneath detects changes in capacitance at the position of the object so that the positional input can generate a corresponding positional input interaction which comprises XY coordinates.

Each positional input interaction may comprise a down state when the interaction is first detected (i.e., when an object presses down on the surface 118), a tracking state (i.e. as the object moves across the surface 118) and an up state (i.e., when the interaction is no longer when the object is lifted from the surface 118).

The system 100 further comprises a plurality of input devices 104. Each input device 104 is configured for detecting touch interactions. Each touch interaction is assigned respective input device ID.

According to the preferred embodiment shown, the input devices 104 are fingertip devices. According to the example shown in FIG. 2, four input devices 104 are worn on the index and thumb fingers of the left and right hands respectively. Each input device 104 would be assigned a respective device ID, such as a numeric index, such as 1-4 for the four input devices 104.

According to an embodiment, each input device 104 comprises a slimline capacitive sensitive pad at each fingertip and which is wired to a central wrist worn controller. The wrist worn controller may receive analog capacitance signals from each pad to detect the touch interactions and to assign the respective touch ID accordingly. The wrist worn controller may transmit the detected touch interactions 107 to a controller 107 wirelessly, such as via Bluetooth.

The input device 104 IDs are assigned a spatial ordering with respect to an axis of the surface 118. For example, with reference to FIG. 2, the access may be along the X axis of the positional inputs 103. The spatial ordering may be assigned directionally with respect to the axis.

The axis may also comprise the Y axis. In embodiments, the access may be nonorthogonal and the orientation thereof may be configurable.

Given the orientation of the hands and the respective positions of the hands shown in FIG. 2, the index finger of the left hand would be assigned spatial ordering 1, the thumb of the left hand would be assigned spatial ordering 2, the thumb of the right hand would be assigned spatial ordering 3 and the index finger of the right hand would be assigned spatial ordering 4.

The controller 105 is configured to receive signals from the positional input 103 and the input devices 104. As alluded to above, the positional input interaction signals 106 may comprise the XY coordinates with respect to the surface 118 of the positional input 103. Furthermore, the touch interaction signals 107 may comprise respective device IDs.

The controller 105 is configured to match positional input interactions 106 with touch interactions 107 by temporally correlating timing of the interactions 106, 107.

The controller 105 is further configured for matching any remaining unmatched interactions 106, 107 by spatially correlating the assigned spatial ordering of the input devices 104 and the coordinates of the positional input interactions 106.

The controller 105 then generates input interactions signals 108 for the device 102 according to matched interactions 106, 107. Each input interaction 108 comprises respective XY coordinates and an ID of a respective input device 104.

The controller 105 may interface a human input device (HID) interface 110 of the device 102. For example, the controller 105 may interface an HID interface 110 of the device 102 to control a mouse cursor 117.

Additionally, or alternatively, the controller interface 111 may be installed in an operating system 113 of the device 102. The controller interface 111 is configured to interact with the controller 105 to receive and implement the interaction signals 108.

In embodiment shown, the input system 101 is separate from the device 102 and interfaces the device 102 via a wired or wireless interface. Alternatively, the input system 101 may be implemented partially or entirely by software executed by the device 102.

The controller interface 111 may be used to provide an application-specific context for the controller 105. For example, different applications 112 may require different configurations of input devices 104 and hand orientations.

Figures 7A, 7B:
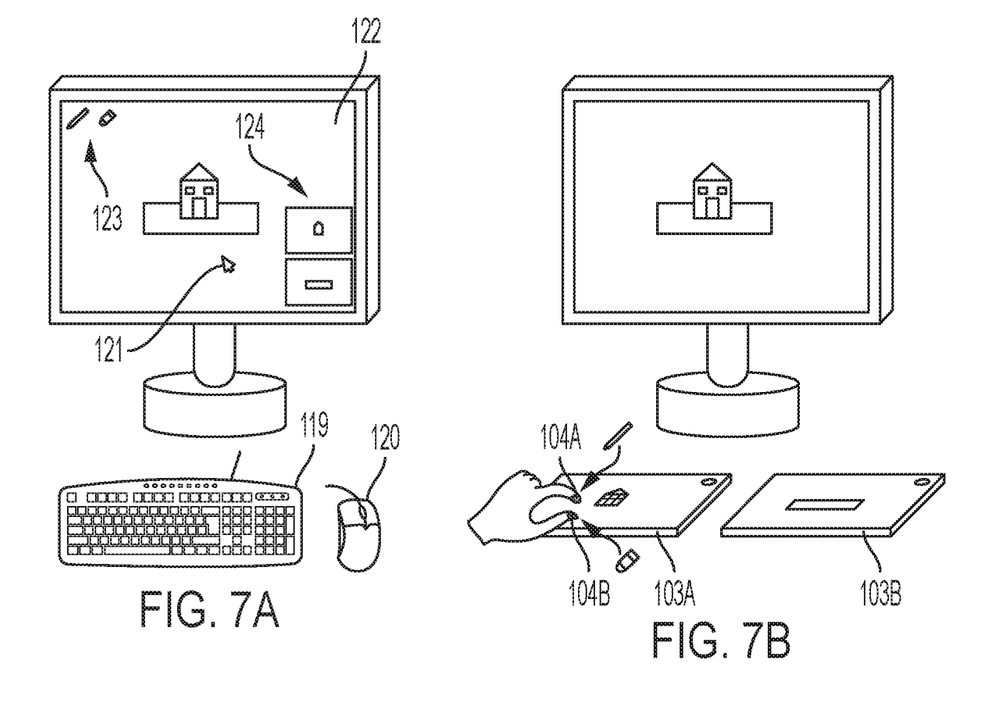
FIG. 7 shows a conventional paint application being configured with the present input system.

For example, FIG. 7A shows an interface 122 of conventional paint application 112 controlled using a keyboard 119 and mouse 120. The mouse 120 controls a mouse pointer 121 on screen.

The interface 122 comprises object selection controls 123, each of which may be selected using the pointer 121 to select a pencil or an eraser. The interface 122 further comprises layer selection controls 124 wherein layers may be selected using the pointer 121.

FIG. 7B shows the paint application 112 configured using the input system 101 wherein a first positional input 103A is used for interaction with a first layer and a second positional input 103B is user interaction with a second layer.

Furthermore, a first input device 104A is used for the pencil and a second input device 104B is used for the eraser. As such, using just one hand, the user may draw and erase on each layer.

As such, according to this example, the currently executing paint application 112 will use the controller interface 111 to transmit the application-specific context 109 to the controller 105.

In this example, the application-specific context is used to determine the spatial ordering down the y-axis of the positional input 103 (given the orientation of the hand) wherein the index finger input device 104A is assigned spatial ordering 1 and the thumb input device 104B is assigned spatial ordering 2.

In embodiments, the controller 105 may interpret the positional input interactions 106 and the touch interactions 107 according to defined regions 125. For example, with reference to FIG. 1, the surface 118 of a positional input 103 may segmented into regions 125.

For example, with reference to the example of FIG. 7, a pair of input devices 104 may be used on the left-hand and another pair of input devices 104 may be used in the right hand.

The region 125 may represent a positional input ID and corresponding respective device IDs. For example, a region 125A may specify that only the input devices 104 of the left-hand may be used on the first positional input 103A and another region 125B may specify that only the input devices 104 of the right hand may be used on the second positional input 103B. Each region 125 may further be assigned an area, spatial ordering and a spatial axis.

Figure 3A:
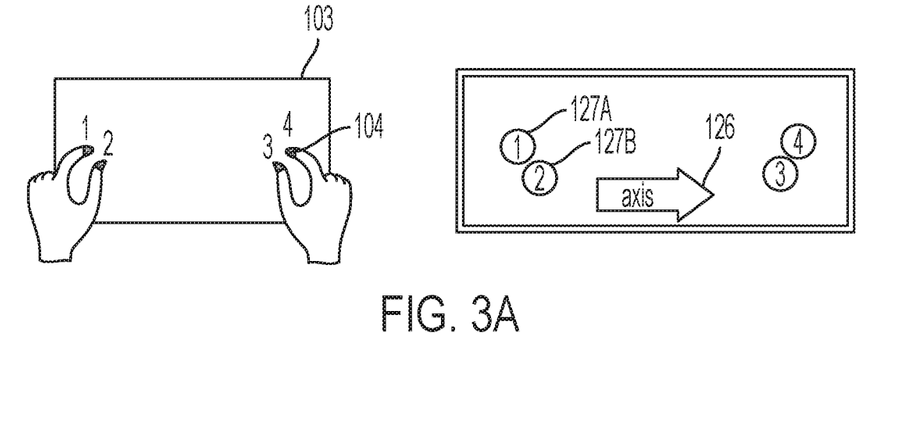
FIG. 3A shows examples of four input devices used on a single positional input.

FIG. 3A gives an example of four input devices 104 used on a single positional input 103. According to this example, both hands are orientated ay 0° and the spatial ordering is with respect to the X axis.

Exemplary interactions 127 are shown at respective coordinates and device IDs.

As alluded to above each interaction 127 may comprise a down state (one sampling frame) when the input device 104 presses against the surface 118 of the positional input 103, tracking states (a plurality of sampling frames) when the input device 104 moves across the surface 118 of the positional input 103) and an up state (one sampling frame) wherein the input device 104 is lifted from the surface 118 of the positional input 103.

The controller 105 may be configured to group down states within a sampling window. The sampling window may be configured to be just long enough so that the controller 105 can receive signals from the positional input 103 and at least one input device 104.

According to the temporal correlation, if only one positional input interaction 106 and only one touch interaction 107 is received within the sampling window, the interactions 106, 107 can be matched.

However, if more than one positional input interaction 106 and/or more than one touch interaction 107 is received within the sampling window, the controller 105 performs spatial correlation. For example, the user may press all four fingers onto the surface 118 of the positional input 103 simultaneously. Spatial correlation may reference the down states of unmatched interactions 106, 107 and the controller 115 may perform pairwise matching of the positional input interactions 106 and the touch interactions 107 according to the spatial ordering and the spatial axis 126.

For example, in FIG. 3 the spatial axis is a positive x-axis for both the region and input devices 104. The input devices 104 is assigned spatial ordering 1 to the index finger of the left hand, spatial ordering 2 to the thumb of the left-hand, spatial ordering 3 to the thumb of the right hand and spatial ordering 4 to the forefinger of the right hand. The coordinates generated on the position input 103 are assigned from left to right with the leftmost coordinate assigned spatial ordering 1 and right most coordinate assigned spatial ordering 4. Furthermore, input device 104 IDs match the assigned spatial ordering.

As such, the controller 105 would perform the spatial correlation by pairwise matching the leftmost coordinates with spatial ordering 1 to determine that the left-hand index finger with spatial ordering 1 performed interaction 127A.

The controller 105 would then match the next leftmost coordinates with spatial ordering 2 to determine that the left-hand thumb finger with spatial ordering 2 performed interaction 127B and so on until all interactions 127 are matched.

Figure 3B:
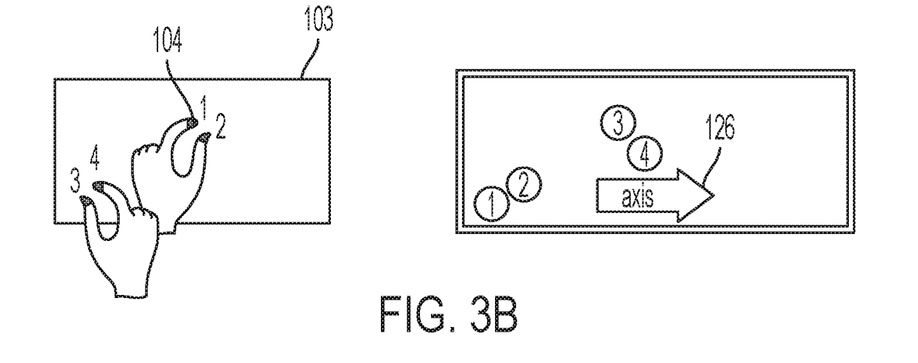
Figure 3C:
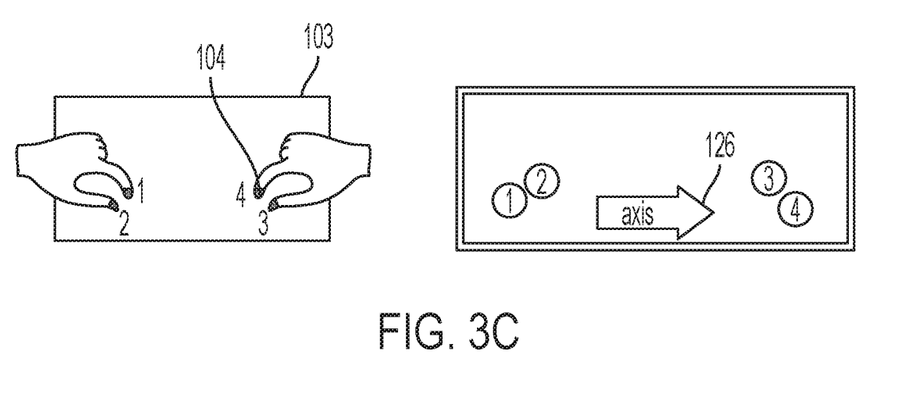

FIG. 3B gives an example of an invalid input caused by swapping of the hands so that the positioning of the input devices 104 no longer correlates with the assigned spatial ordering. FIG. 3C further gives an example of an invalid input caused by changing the orientation of the hands.

Figure 4A:
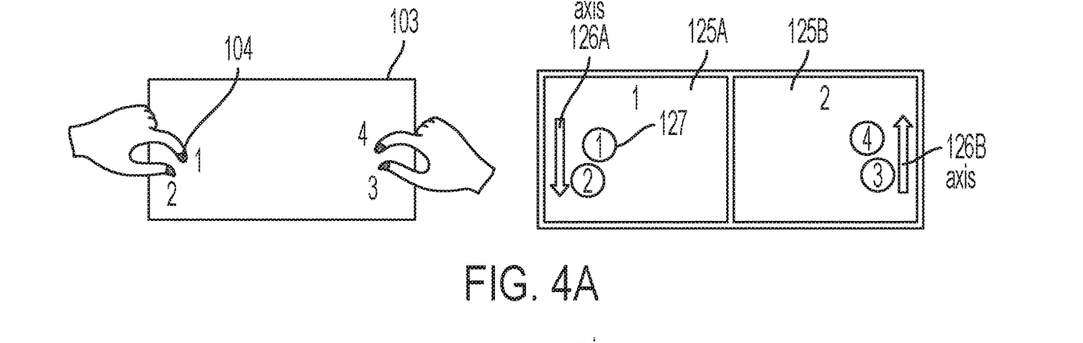
FIG. 4A shows an example wherein a user uses a pair of input devices 104 on each hand and wherein the hands are orientated at 90°.

FIG. 4A gives an example wherein a user uses a pair of input devices 104 on each hand and wherein the hands are orientated at 90°. FIG. 4 further gives an example wherein spatial ordering is assigned to respective regions 125 of the positional input 103. In the example shown, each region 125 is a rectangular and may be defined by of minimum and maximum XY coordinates.

First region 125A may have spatial ordering assigned to a downward vertical axis 126A and second region 125B would have spatial ordering assigned to an upward vertical axis.

More specifically, the first region 125A may have spatial ordering of {1,2,3,4} down along the vertical axis and the second region 125B may have spatial ordering of {1,2,3,4} up along the vertical axis.

Figure 4B:
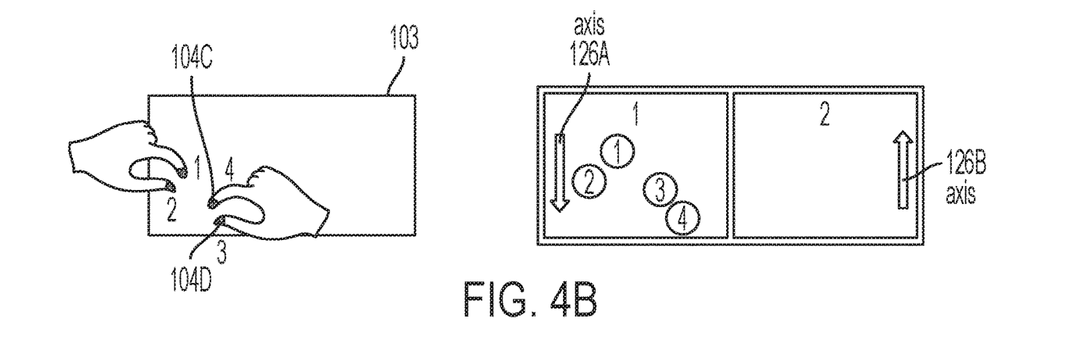

FIG. 4B gives an example of an invalid input because the right hand is inverted wherein the forefinger input device 104C having ID 4 is above the thumb input device 104D having ID 3, thereby being incompatible with the assigned spatial ordering of {1,2,3,4}.

Figure 4C:
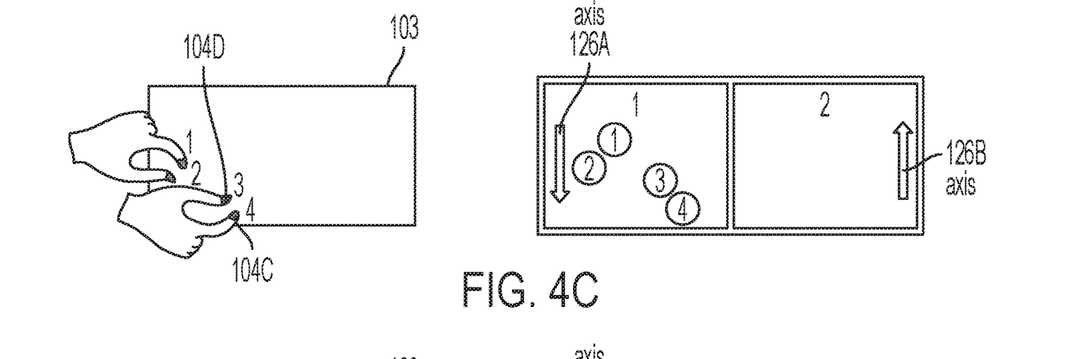

However, FIG. 4C gives an example of a valid input because the right hand is now rotated so that the input device IDs correlate with the assigned spatial ordering.

Figure 4D:
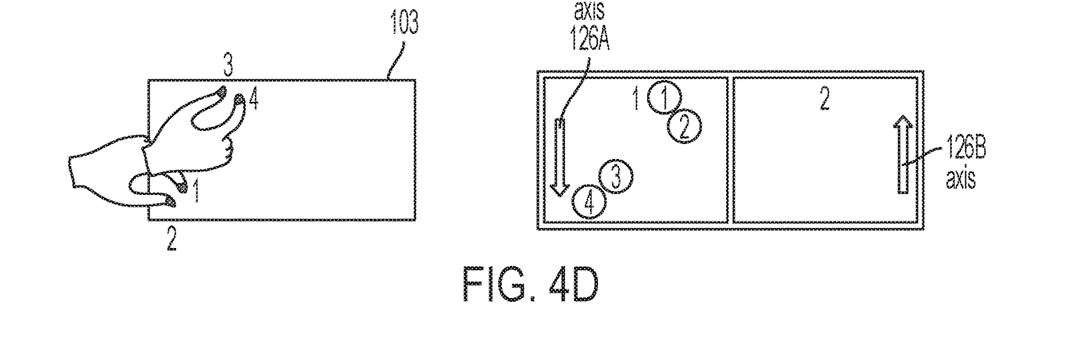

FIG. 4D gives a further example of an invalid input because the input devices 104 of the right hand are above the input devices 104 of the left hand, thereby being incompatible with the assigned spatial ordering.

Figure 5A:
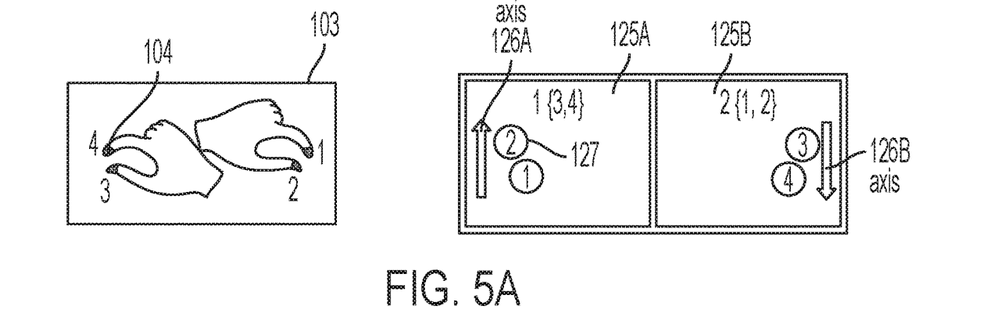
FIG. 5A shows an example wherein input devices 104 are restricted to particular regions 125.

FIG. 5A gives an example wherein input devices 104 are restricted to particular regions 125. This is represented by a list of input device IDs next to the region's spatial ordering. The list of input device IDs is sorted by the input device's spatial ordering. In the example shown, forefinger and thumb input devices 104 are used on each hand, each hand is orientated at approximately 90° and the hands are crossed over. The resulting match is {3,4,1,2}, i.e. coordinate 1 matches to device 3, coordinate 2 to device 4, and so on.

First region 125A has spatial ordering assigned up a vertical Y-axis 126A and second region 125B has spatial ordering assigned down a vertical Y-axis 126B.

Furthermore, according to FIG. 5A first region 125A is restricted to interacting with input devices 104 having IDs 3 and 4 whereas second region 125B is restricted to interacting with input devices 104 having IDs 1 and 2.

Figure 5B:
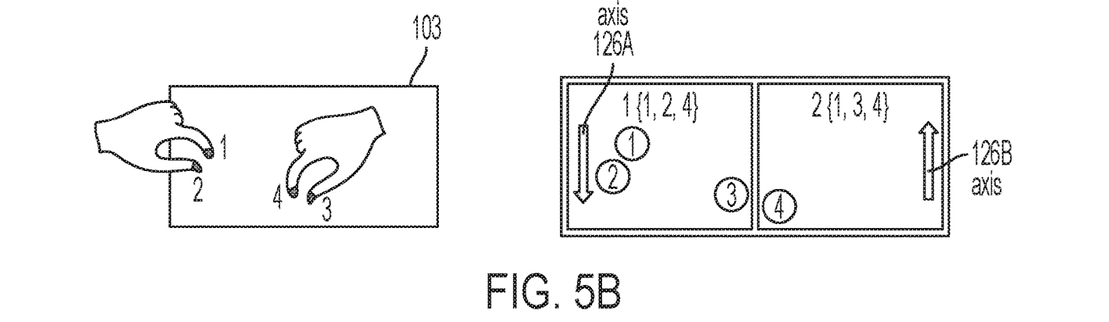

FIG. 5B gives an example of a valid input because the first region 125A is restricted to input device IDs {1,2,4} as such coordinates 1,2,3 is matched to {1,2,4}, and coordinate 4 is matched to 3 as id 1 has been consumed in prior coordinate match. The resulting match is {1,2,4,3}.

Figure 5C:
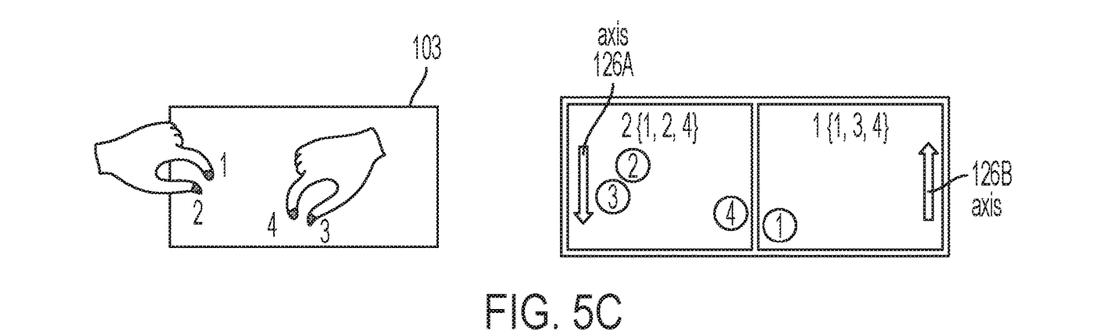

FIG. 5C is an example of an invalid input because when compared to FIG. 5B, the region's spatial ordering is reversed and therefore the coordinates are sorted differently, starting with the right region, then the left region. Further it is not possible to match coordinate 4 to an input device ID because the valid input device ids {1,2,4} have been previously consumed. The resulting match is {1,2,4,?}.

Figure 5D:
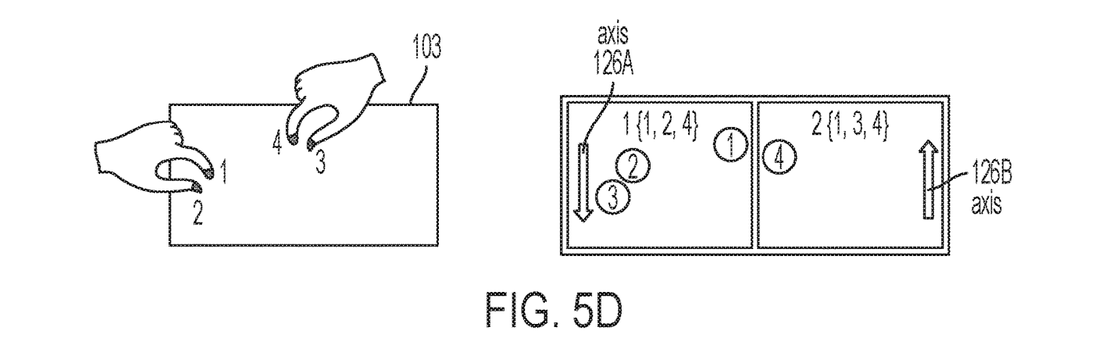

FIG. 5D gives a further example of an invalid input because coordinate 1 is matched incorrectly to input device 1 instead of 4. The resulting match is {1,2,4,3}.

Figure 6A:
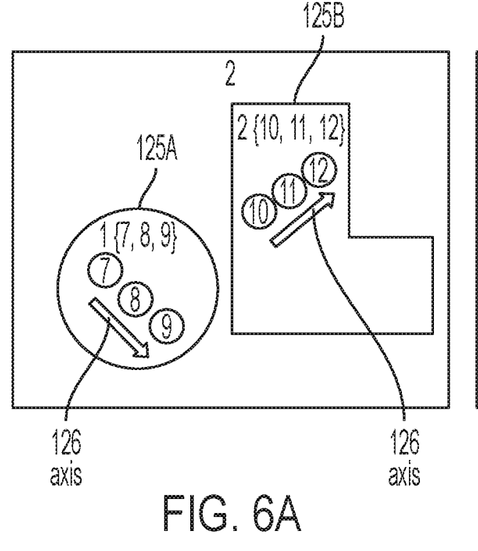
FIG. 6 shows examples of nonorthogonal spatial ordering axes and nonrectangular regions.
Figure 6B:
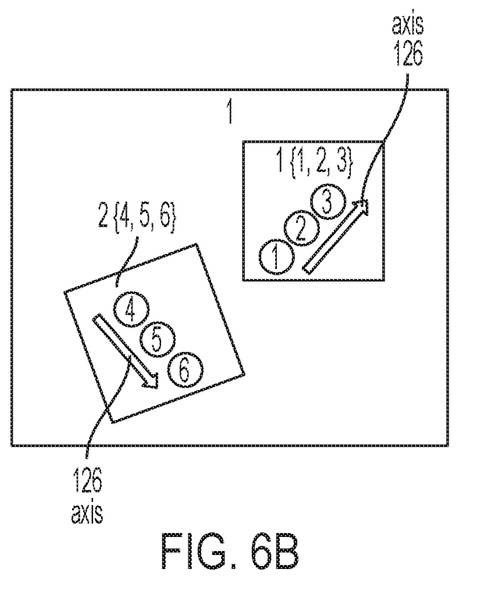

FIG. 6 gives an example wherein the spatial ordering axes 126 are nonorthogonal and wherein the orientation thereof may be configured including in accordance with the application-specific context. In the example shown, the spatial ordering axes may be at approximately 45° with respect to the orthogonal axes.

Furthermore, FIG. 6A gives an example of non-rectangular regions wherein a first region 125A is circular and a second region 125B is L-shaped.

Furthermore, FIG. 6 gives the example wherein each region 125 is restricted to certain device identifiers, and the region's spatial ordering may be affected by the parent positional input's spatial ordering.

Whereas FIG. 6 shows the regions 125 being separate, in embodiments, the regions 125 may be overlapping.

In embodiments, the orientation and/or shape of the regions 125 may be repositioned according to application's requirements.

Figure 8:
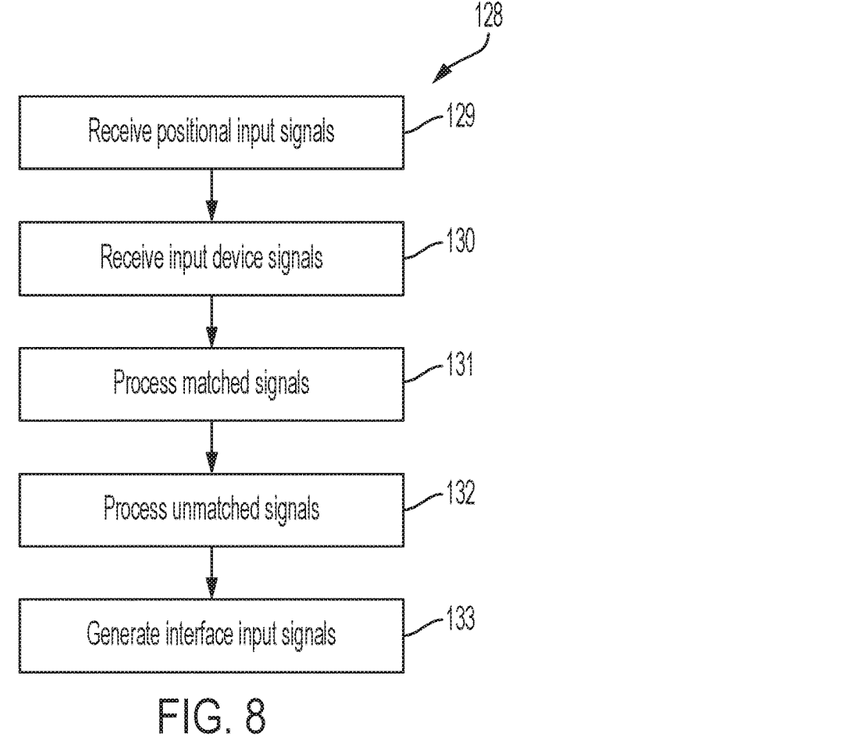
FIG. 8 shows processing 128 by the controller for generating the input interactions 108.

FIG. 8 shows processing 128 by the controller for generating the input interactions 108.

At step 129, the controller 105 receives the positional input interactions 106 which may be stored in a buffer. At step 130, the controller 105 receives the touch interactions 107 which may also be stored in a buffer.

Where the system 100 comprises more than one positional input 103, at step 131, the controller 105 assigns each positional input interaction 106 to a respective positional input 103 whereafter it is removed from the buffer.

Furthermore, the controller 105 may assign each such interaction 107 to a respective input device 104 whereafter it is removed from the buffer.

At step 132, the controller 105 matches the positional input interactions 107 and the touch interactions 107 to generate the input interactions 108 for the device 102.

Figure 9:
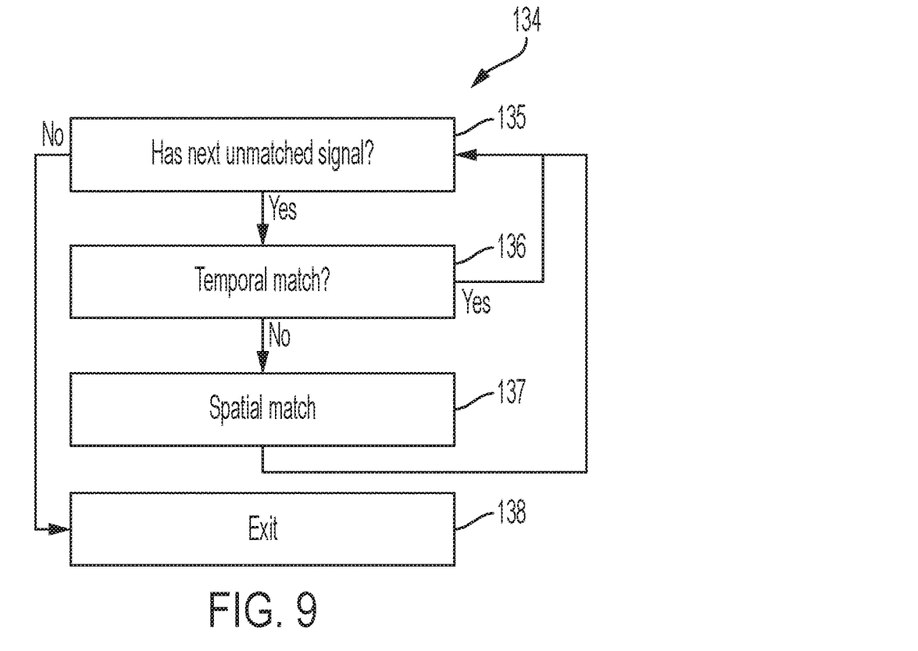
FIG. 9 shows processing 134 by the controller 105 to match the positional input interactions 106 with the touch interactions 107.

FIG. 9 shows processing 134 (being a sub flow of step 132) by the controller 105 to match the positional input interactions 106 with the touch interactions 107.

At step 135, the controller 105 takes an unmatched positional input interaction 106 and, at step 136 attempts to match it to a corresponding touch interaction 107. As alluded to above, a temporal match may be found where only one touch interaction 107 occurs within a sampling window associated with a positional input interaction 106, such as a sampling window commencing from the down state of the positional input interaction 106.

If temporal matching fails, such as wherein more than one touch interaction 107 occurs within the same sampling window, the processing 134 may commence to spatial matching at step 137.

Temporal and/or spatial matching occurs at step 136 and 137 for all interactions 106, 107 in the buffer whereafter the processing 134 exits at step 138.

Figure 10:
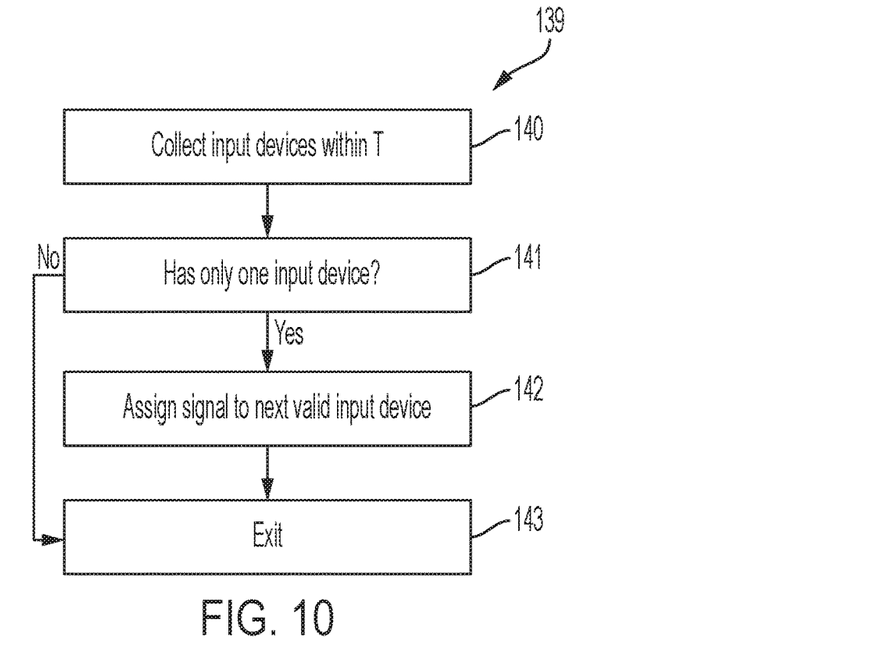
FIG. 10 shows temporal matching processing 139 by the controller 105.

FIG. 10 shows temporal matching processing 139 (being a sub flow of step 136) by the controller 105 wherein, at step 140, the controller ascertains 105 the touch interactions 107 falling within a sampling window (T) associated with a positional input interaction 106 (such as a sampling window commencing from the down state of a positional input interaction 106). The controller 105 may determine whether the down state of a touch interaction 107 falls within the window.

Figure 11:
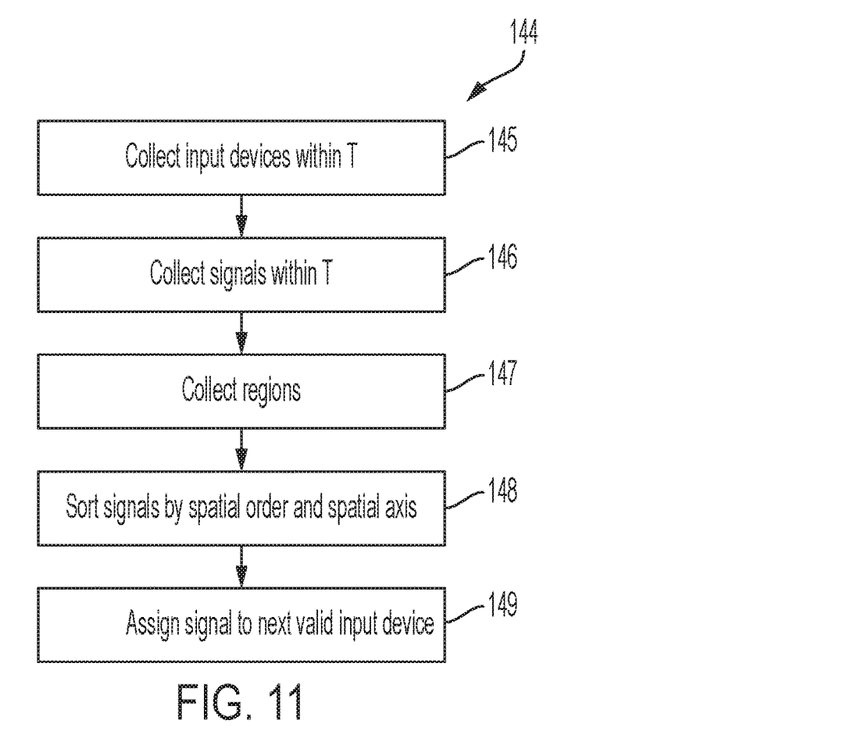
FIG. 11 shows spatial matching processing by the controller.

If at step 141, only one touch interaction 107 is found within the sampling window, a match is assigned at step 142 otherwise, the processing 139 exits at step 143 and proceeds to the spatial matching processing shown in FIG. 11 step 144 (being a sub flow of step 137).

At step 145 and 146, the controller 105 ascertains positional input interactions 106 and touch interactions 107 falling within a sampling window. The chosen sampling window may commence from the down state of a positional input interaction 106.

At step 147, the controller 105 may ascertain if any regions are applicable based on the collected positional input interactions.

At step 148, the controller will determine the spatial ordering of each collected positional input interaction 106 by using the spatial order and spatial axis of a corresponding region 125.

At step 149, the controller performs pairwise matching of positional input interaction to an input device 104, by the sorted order. A match is found if the input device is valid for the positional interaction's region 125 and has not been consumed in a previous match.

Figure 12:
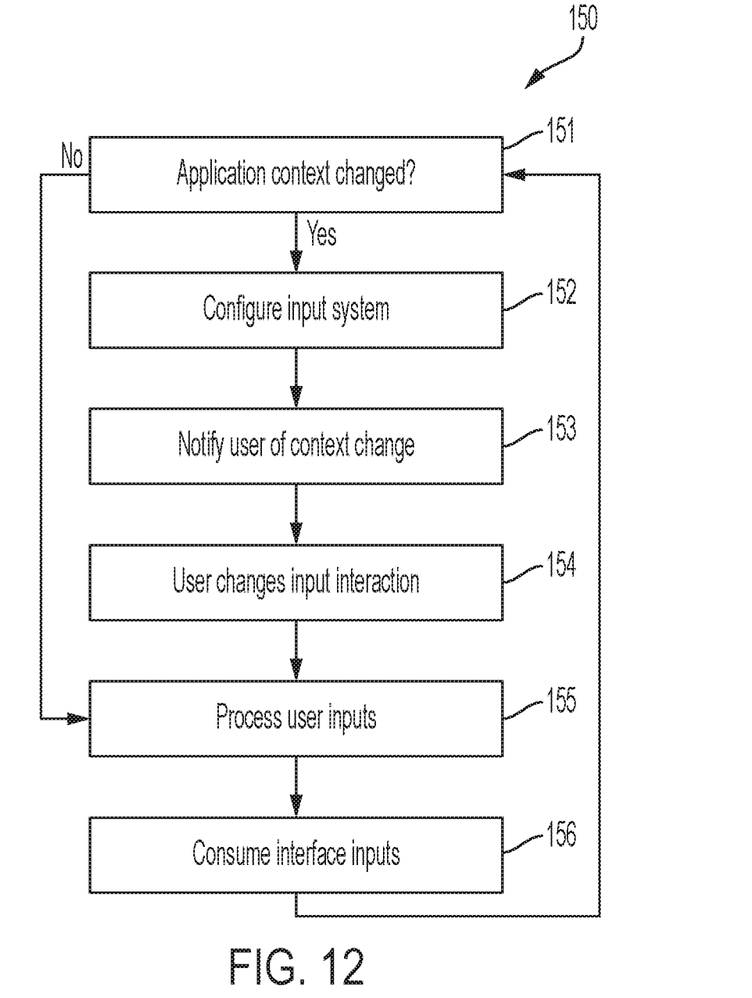
FIG. 12 shows application-specific context processing 150.

FIG. 12 shows application-specific context processing 150.

At step 151, the application 112 may detect changing of an application-specific context, such as wherein the paint application of the example of FIG. 7B is launched. The application 112 may use the controller interface 111 to transmit the application-specific context 109 to the controller 105 to configure the input system 101 at step 152.

As alluded to above, the application-specific context 109 may be used to determine the spatial ordering and the orientation of the spatial ordering axis.

Furthermore, the application-specific context 109 may specify regions 125 wherein device IDs are assigned to an area of a positional input 103.

At step 153 the user may be notified of the change in application-specific context. Such notification may instruct the user of the correct positioning of the hands and input devices 104 which the user follows at step 154.

As such, at step 155, the input system 101 processes the positional input interactions 106 and the touch interactions 107 according to the new application-specific context to generate the input interaction signals at step 156.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. An input system interfacing a device, the system comprising:
   a positional input configured for detecting positional input interactions with a surface thereof, each positional input interaction assigned respective coordinates with respect to the surface;
   a plurality of input devices, each assigned a respective input device ID, configured for electronically detecting touch interactions, each touch interaction assigned to the respective input device ID, the input devices assigned a spatial ordering, the spatial ordering is directional with respect to a spatial axis of the surface;
   a controller configured to:
      receive signals from the positional input and the input devices;
      match positional input interactions with touch interactions by temporally correlating timing of the interactions;
      match any remaining unmatched interactions by spatially correlating the assigned spatial ordering of the input devices and the coordinates of the positional input interactions; and generate input interaction signals for the device according to matched interactions, each input interaction comprising respective coordinates and an ID of a respective input device.

2. The system as claimed in claim 1, wherein an orientation of the spatial axis is configurable.

3. The system as claimed in claim 1, wherein the surface of the positional input comprises regions and wherein spatial ordering is assigned to respective regions.

4. The system as claimed in claim 1, wherein the system comprises a plurality of positional inputs and wherein spatial ordering is assigned to respective positional inputs.

5. The system as claimed in claim 1, wherein the controller is configurable with an application-specific context and wherein the application-specific context determines the spatial ordering.

6. The system as claimed in claim 5, wherein the controller is configured to receive application-specific context changes from the device.

7. The system as claimed in claim 6, wherein a controller interface is installed on an operating system of the device which transmits the application-specific context changes to the controller.

8. The system as claimed in claim 1, wherein the controller is configured to process the positional input interactions according to defined regions.

9. The system as claimed in claim 8, wherein each region comprises a positional input ID, respective input device IDs, spatial ordering and spatial axis.

10. The system as claimed in claim 9, wherein the regions overlap.

11. The system as claimed in claim 9, wherein the controller is configured to discard a touch interaction having an ID not matching input device IDs of a respective region.

12. The system as claimed in claim 9, wherein at least one of the shape and orientation of a region is application configurable.

13. The system as claimed in claim 1, wherein the controller is configured to temporally match a touch interaction and a positional input interaction only if the touch interaction is the only touch interaction occurring within a sampling window associated with a positional input interaction.

14. The system as claimed in claim 13, wherein the sampling window commences from a down state of the positional input interaction.

15. The system as claimed in claim 13, wherein the controller is configured to only perform spatial correlation if more than one touch interaction occurs within the sampling window.

* * * * *